US008679617B2

(12) United States Patent
Eibon et al.

(10) Patent No.: US 8,679,617 B2
(45) Date of Patent: Mar. 25, 2014

(54) SOLAR REFLECTIVE COATINGS SYSTEMS

(75) Inventors: William E. Eibon, Elyria, OH (US); Brian Dillon, North Olmsted, OH (US)

(73) Assignee: PRC DeSoto International, Inc., Sylmar, CA (US)

( * ) Notice: Subject to any disclaimer, the term of this patent is extended or adjusted under 35 U.S.C. 154(b) by 62 days.

(21) Appl. No.: 12/917,576

(22) Filed: Nov. 2, 2010

(65) Prior Publication Data

US 2012/0107584 A1    May 3, 2012

(51) Int. Cl.
*B32B 7/02*    (2006.01)
*B32B 27/20*    (2006.01)

(52) U.S. Cl.
USPC ............................................ 428/212; 428/220

(58) Field of Classification Search
USPC ........................................................ 428/212
See application file for complete search history.

(56) References Cited

U.S. PATENT DOCUMENTS

| | | |
|---|---|---|
| 2,294,875 A | 9/1942 | Hexter |
| 4,311,623 A | 1/1982 | Supcoe |
| 4,546,045 A | 10/1985 | Elias |
| 5,319,001 A | 6/1994 | Morgan et al. |
| 5,506,045 A | 4/1996 | Grochal |
| 5,540,998 A | 7/1996 | Yamada et al. |
| 5,749,959 A | 5/1998 | Supcoe et al. |
| 5,939,182 A | 8/1999 | Huang et al. |
| 5,962,143 A | 10/1999 | Krathauser et al. |
| 6,017,981 A | 1/2000 | Hugo |
| 6,194,484 B1 | 2/2001 | Hugo |
| 6,294,014 B1 | 9/2001 | Woodworth et al. |
| 6,296,899 B1 | 10/2001 | Iizuka |
| 6,306,209 B1 | 10/2001 | Woodworth et al. |
| 6,336,966 B1 | 1/2002 | Coca et al. |
| 6,365,666 B1 | 4/2002 | McCollum et al. |
| 6,366,397 B1 | 4/2002 | Genjima et al. |
| 6,376,597 B1 | 4/2002 | Coca et al. |
| 6,399,228 B1 | 6/2002 | Simpson |
| 6,441,066 B1 | 8/2002 | Woodworth et al. |
| 6,462,125 B1 | 10/2002 | White et al. |
| 6,521,038 B2 | 2/2003 | Yanagimoto et al. |
| 6,590,049 B1 | 7/2003 | O'Dwyer et al. |
| 6,623,556 B2 | 9/2003 | Zama |
| 6,642,301 B2 | 11/2003 | White et al. |
| 6,875,800 B2 | 4/2005 | Vanier et al. |
| 7,137,713 B2 | 11/2006 | Harasawa et al. |
| 7,157,112 B2 | 1/2007 | Haines |
| 7,211,324 B2 | 5/2007 | Kamimori |
| 2001/0044489 A1 | 11/2001 | Hugo |
| 2002/0188051 A1 | 12/2002 | Hugo |
| 2004/0018360 A1 | 1/2004 | Hugo |
| 2004/0068046 A1 | 4/2004 | Hugo |
| 2004/0142205 A1 | 7/2004 | Chen et al. |
| 2004/0191540 A1* | 9/2004 | Jakobi et al. ................. 428/457 |
| 2005/0056189 A1* | 3/2005 | Decker et al. ................. 106/493 |
| 2005/0129871 A1 | 6/2005 | Ruther et al. |
| 2005/0129964 A1 | 6/2005 | Hugo |
| 2005/0170171 A1 | 8/2005 | Vanier |
| 2005/0215685 A1 | 9/2005 | Haines |
| 2005/0287348 A1 | 12/2005 | Faler et al. |
| 2006/0229407 A1 | 10/2006 | Vogel et al. |
| 2006/0251895 A1 | 11/2006 | Lambert et al. |
| 2007/0087199 A1 | 4/2007 | Yoshimura et al. |
| 2008/0102270 A1 | 5/2008 | Shiao et al. |
| 2008/0188610 A1 | 8/2008 | Polk |
| 2010/0047620 A1* | 2/2010 | Decker et al. ................. 428/688 |
| 2010/0233461 A1 | 9/2010 | Wood et al. |

FOREIGN PATENT DOCUMENTS

| | | |
|---|---|---|
| DE | 4035062 A1 | 5/1992 |
| DE | 4419748 C2 | 5/1999 |
| DE | 10248234 B3 | 2/2004 |
| EP | 0218436 | 4/1987 |
| EP | 0361327 A1 | 4/1990 |
| EP | 0246342 B1 | 7/1991 |
| EP | 1817383 | 2/2009 |
| FR | 2538756 | 7/1984 |
| GB | 2420995 | 6/2006 |
| JP | 5574862 | 6/1980 |
| JP | 4246478 | 9/1992 |
| JP | 05293434 | 11/1993 |
| JP | 2000-279881 | 10/2000 |
| JP | 2001-240767 | 9/2001 |
| JP | 2002-060698 | 2/2002 |
| JP | 2005-000821 | 1/2005 |
| JP | 2006-289247 | 10/2006 |
| JP | 2010-089281 | 4/2010 |
| WO | 9618858 | 6/1996 |
| WO | 02/14445 A1 | 3/2001 |
| WO | 2004/090030 A1 | 10/2004 |
| WO | 2005/095528 A2 | 10/2005 |
| WO | 2006/058782 A1 | 6/2006 |
| WO | 2009/045981 A2 | 4/2009 |
| WO | 2009/048515 A1 | 4/2009 |
| WO | 2009/146317 | 12/2009 |
| WO | 2009/146318 A1 | 12/2009 |
| WO | 2010/030971 A2 | 3/2010 |

OTHER PUBLICATIONS

Spinelli, Harry J., Group transfer polymerization and its use in water based pigment dispersants and emulsion stabilizers, Progress in Organic Coatings 27, (1966), 255-260, Elsevier Science S.A.
Wake, L.V., The effect of pigments in formulating solar reflecting and infrared emitting coatings for military applications, (1990), 78-80, Horizons.
Military Specification, MIL-C-46127A(MR), (Apr. 26, 1977), Coating, Gray, Undercoat (Solar Heat Reflecting), 1-16.
Military Specification, MIL-E-46136A(MR), (Sep. 7, 1971), Enamel, Semi-Gloss, Alkyd, Solar Heat Reflecting, Olive Drab, 1-28.
Military Specification, MIL-E-46117(MR), (Dec. 29, 1967), Enamel, Alkyd, Lustreless, Solar Heat Reflecting, Olive Drab, 1-15.
Military Specification, MIL-E-46117A(MR), (Oct. 6, 1970), Enamel, Alkyd, Lustreless, Solar Heat Reflecting, Olive Drab, 1-25.
Military Specification, MIL-E-460968(MR), Amendment 1, (Dec. 8, 1969), Enamel, Lustreless, Quick Drying, Styrenated Alkyd Type, Solar Heat Reflecting, Olive Drab, 1-30.
Pickett, Charles F., Solar Heat Reflecting Coatings, Society of Automotive Engineers, International Automotive Engineering Congress, Detroit, Michigan, (Jan. 13-17, 1969), 1-5.
Brady, Robert F. and Wake, Lindsay V., Principles and formulations for organic coatings with tailored infrared properties, Progress in Organic Coatings, 20, (1992), 1-25, Elsevier Sequola.

* cited by examiner

*Primary Examiner* — Aaron S Austin
*Assistant Examiner* — Tahseen N Khan
(74) *Attorney, Agent, or Firm* — Bill Kuss; Christine W. Trebiloock

(57) ABSTRACT

Disclosed are infrared reflective coating systems. The coating compositions include an infrared transparent pigment and an infrared reflective pigment.

16 Claims, No Drawings

SOLAR REFLECTIVE COATINGS SYSTEMS

FIELD OF THE INVENTION

The present invention relates generally to solar reflective coating systems. These coating systems include at least two coating layers; a first coating layer and a second coating layer deposited beneath the first coating layer. The first coating layer is dark in appearance but substantially transparent to infrared radiation. The second coating layer reflects infrared radiation but exhibits a darkness appearance similar to the first coating layer, provides color contribution to the first coating layer and hides the underlying substrate and any underlying coating layers when applied at a relatively thin film thickness.

BACKGROUND INFORMATION

For many coating applications such as automotive coatings, aerospace coatings, industrial coatings and architectural coatings, dark colors, such as black and dark blue are particularly desirable for aesthetic purposes. However, dark colored coatings have historically been susceptible to absorption of near-infrared radiation because they often rely on the use of pigments, such as carbon black, that absorb near-infrared radiation in addition to visible radiation. Near-infrared radiation, i.e., light energy having a wavelength of from 700 to 2500 nanometers, constitutes about 45% of the solar energy that reaches the earth's surface. Heat is a direct consequence of the absorption of near-infrared radiation. As a result, dark colored coatings have historically been susceptible to substantially increased temperatures, particularly on sunny days, which is often undesirable for many reasons. Thus, solar heat (near-infrared) reflecting coatings have been desired.

Various approaches for achieving dark solar heat reflecting coatings have been investigated. In one approach, a two layer coating system is employed in which an upper layer is colored with pigments that absorb visible radiation but are transparent to near-infrared radiation, such as organic black pigments (perylene blacks are an example) or other organic pigments (such as phthalocyanine blues and greens and carbazole dioxazine violet), and an underlayer, such as a highly reflective white undercoat, that reflects near-infrared radiation, reduces the temperature increase of the coating system. An example of such a coating system is described in United States Patent Application Publication No. 2004/0191540 A1.

To date, this approach has suffered from some drawbacks. For example, the underlayer, which is often light in appearance, has a tendency to "grin through" in the event that the upper layer is damaged. This can be particularly problematic in applications where appearance is critically important but the coatings are exposed to environments in which coating damage is not uncommon.

Second, the formulation of many dark colored upperlayers are such that they rely on an underlayer (typically a primer) to contribute to the achievement of a proper dark color. A white or lightly colored underlayer will not do this.

Third, in some applications, the underlayer must be opaque at a relatively low film thickness. This is because other coating layers, such as electrodeposited corrosion resisting primers, often lie between the underlayer and the substrate. These coating layers are often susceptible to degradation if exposed to ultraviolet radiation. Hiding of such coating layers by the underlayer must be achieved at a relatively low film thickness due to cost considerations, for example.

As a result, it would desirable to provide solar reflective coatings systems that overcome the deficiencies described above while still providing solar reflection performance comparable to solar reflective coating systems that do not overcome these deficiencies. The invention described herein was made in view of the foregoing desire.

SUMMARY OF THE INVENTION

In certain respects, the present invention is directed to coating systems comprising a first coating layer and a second coating layer deposited beneath at least a portion of the first coating layer. The first coating layer is dark, i.e., it exhibits a CIELAB L *value of no more than 40 and comprises: (a) a film-forming resin; and (b) a visibly absorbing infrared transparent pigment. The second coating layer comprises: (a) a film-forming resin; (b) a thin flake metal or metal alloy infrared reflective pigment; and (c) a visibly absorbing infrared transparent pigment. The first coating layer and the second coating layer have a contrast ratio ($L^*_{second}/L^*_{first}$) of 0.8:1 to 1.7:1. The coating system has a % total solar reflectance ("TSR") of at least 25% and the second coating layer has a % TSR of at least 25%.

The present invention is also related to, inter cilia, related methods for coating a substrate and coated substrates.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to coating systems comprising a first coating layer and a second coating layer deposited beneath the first coating layer. The coating systems of the present invention can be deposited onto any of a number of different substrates. In addition, the coating systems may, and often do, comprise additional coating layers in addition to the first coating layer and the second coating layer.

The substrate upon which the coating system of the present invention may be deposited may take numerous forms and be produced from a variety of materials. In certain embodiments, the substrate takes the form of (i) an automobile component, such as an interior or exterior metal panel, leather or fabric seating areas, plastic components, such as dashboards or steering wheels, and/or other interior vehicle surfaces; (ii) an aerospace component, such as an aircraft exterior panel (which may be metal, such as aluminum or an aluminum alloy, or produced from a polymeric composite material, for example), leather, plastic or fabric seating areas and interior panels, including control panels and the like; (iii) a building component, such as exterior panels and roofing materials; and (iv) industrial components, among others.

Suitable substrate materials include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrate materials include, but are not limited to, foils, sheets, or workpieces constructed of cold rolled steel, stainless steel and steel surface-treated with any of zinc metal, zinc compounds and zinc alloys (including electro galvanized steel, hot-dipped galvanized steel, GAL-VANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester micro fibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome talmed, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co)polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

In certain embodiments, such as in a coating system used in the automotive or aerospace industry, for example, a pretreated metal substrate (such as is mentioned above) may be coated with an electrodeposited coating. After the electrodeposited coating is cured, a primer-surfacer coating is applied onto at least a portion of the electrodeposited coating. The primer-surfacer coating is often applied to the electrodeposited coating and cured prior to subsequent application of another coating.

The primer-surfacer coating often serves to enhance chip resistance of subsequently applied coating layers as well as to aid in the appearance of the subsequently applied coating layers. In certain embodiments of the present invention, the second coating layer is a primer-surfacer coating. In some embodiments, the first coating layer of the coating system acts as a color-imparting basecoat that is deposited onto at least a portion of the primer-surfacer coating layer.

In some embodiments, the coating systems of the present invention further comprise a substantially clear coating, i.e., a clearcoat. As used herein, the term "substantially clear" refers to a coating that is substantially transparent and not opaque. In some embodiments, the clearcoat may comprise a colorant but, in such cases, the colorant is not present in an amount sufficient to render the coating opaque. Clearcoats described in, for example, U.S. Pat. Nos. 5,989,642; 6,245,855; 6,387, 519; and 7,005,472, can be used in the coating systems of the present invention. In certain embodiments, the clearcoat comprises particles, such as silica particles, that are dispersed in the clearcoat (such as at the surface of the clearcoat).

As indicated, in the coating systems of the present invention, the first coating layer is dark, i.e., it exhibits a CIELAB L* value of more than 40, such as no more than 35, no more than 30, or, in some cases, no more than 28. For purposes of the present invention, CIELAB L* values are measured using a Gretag MacBeth ColorEye 7000A (specular included). Moreover, the first coating layer in the coating systems of the present invention comprise: (a) a film-forming resin; and (b) a visibly absorbing infrared transparent pigment.

As used herein, the term "film-forming resin" refers to resins that can form a self-supporting continuous film on at least a horizontal surface of a substrate upon removal of any diluents or carriers present with the film-forming resin or upon curing at ambient or elevated temperature.

Film-forming resins that may be used in the first coating layer include, without limitation, those used in automotive OEM coating compositions, automotive refinish coating compositions, industrial coating compositions, architectural coating compositions, coil coating compositions, packaging coating compositions, protective and marine coating compositions, and aerospace coating compositions, among others.

In certain embodiments, the film-forming resin included within the coatings described herein comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coatings described herein comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

The coatings described herein can comprise any of a variety of thermoplastic and/or thermosetting compositions known in the art. The coatings may be deposited from water-based or solvent-based liquid compositions, or, alternatively, a composition in solid particulate form, i.e., a powder coating.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

Thermosetting or curable coating compositions typically comprise film forming resins having functional groups that are reactive with the crosslinking agent. The film-forming resin in the coatings described herein may be selected from any of a variety of polymers well-known in the art. The film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

Appropriate mixtures of film-forming resins may also be used in the preparation of the coatings described herein.

The first coating layer in the coating systems of the present invention also comprises a visibly absorbing infrared transparent pigment. As used herein, the term "infrared transparent pigment" refers to a pigment that is substantially transparent in the near-infrared wavelength region (700 to 2500 nanometers), such as is described in United States Patent Application Publication No. 2004/0191540 at [0020]-[0026], the cited portion of which being incorporated herein by reference, without appreciable scattering or absorption of radiation in such wavelengths. In certain embodiments, the infrared transparent pigment has an average transmission of at least 70% in the near-infrared wavelength region. As used herein, the term "visible absorbing" refers to a pigment that substantially absorbs radiation in at least some wavelengths within the visible region of 400 to 700 nanometers. In some cases, a visible absorbing pigment used in the present coating compositions has at least about 70% (more preferably at least about 80%) of its total absorbance in the visible spectrum in the range of about 400 to about 500 nanometers. In some cases, the visible absorbing pigment has at least about 70% (more preferably at least about 75%) of its total absorbance in the visible spectrum in the range of about 500 to about 600 nanometers. In some cases, the visible absorbing pigment has at least about 60% (more preferably at least about 70%) of its total absorbance in the visible spectrum in the range of about 600 to about 700 nanometers.

Non-limiting examples of suitable visibly absorbing infrared transparent pigments include, for example, copper phthalocyanine pigment, halogenated copper phthalocyanine pigment, anthraquinone pigment, quinacridone pigment, perylene pigment, monoazo pigment, disazo pigment, quinophthalone pigment, indanthrone pigment, dioxazine pigment, transparent iron oxide brown pigment, transparent iron oxide red pigment, transparent iron oxide yellow pigment, cadmium orange pigment, ultramarine blue pigment, cadmium yellow pigment, chrome yellow pigment, cobalt aluminate blue pigment, cobalt chromite blue pigment, iron titanium brown spinel pigment, manganese antimony titanium buff rutile pigment, zinc iron chromite brown spinel pigment, isoindoline pigment, diarylide yellow pigment, brominated anthranthron pigment and the like.

In certain embodiments, the infrared transparent pigment has a % of reflectance that increases at wavelengths of from 750 to 850 nanometers along the electromagnetic spectrum, such as is described in the aforementioned United States Patent Application Publication No. 2004/0191540. In some cases, the infrared transparent pigment has a % of reflectance that ranges from at least 10% at a wavelength of 750 nanometers along the electromagnetic spectrum to at least 90% at a wavelength of 900 nanometers.

In certain embodiments, the infrared transparent pigment comprises an infrared transparent black pigment, such as those that rely in part upon a perylene type structure, that is illustrated below:

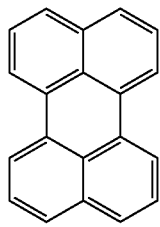 [SMILES: c1cc2cccc3c4cccc5cccc(c(c1)c23)c54]

Commercially available examples of such pigments include, Lumogen® Black FK 4280 pigment from BASF Corporation, Southfield, Mich., Paliogen® Black L0086, from BASF, which has a Colour Index of "Pigment Black 32" (Part 1) and "71133" (Part 2), as well as Paliogen® Black S0084, which has Colour Index of "Pigment Black 31" (Part 1) and "71132" (Part 2). Further examples of infrared transparent black pigments that are suitable for use in certain embodiments of the present invention are described in United States Patent Application publication No. 200910098476 A1 at [0030] to [0034], the cited portion of which being incorporated by reference herein, and include those having a perylene isoindolene structure, an azomethine structure, and/or an aniline structure.

The infrared transparent pigment is often present in the composition from which the first coating layer is deposited in an amount of at least 0.5 percent by weight, or at least 1 percent by weight, and/or at least 5 percent by weight, based on the total solids weight of the composition. The infrared transparent pigment is also typically present in the composition from which the first coating layer is deposited in an amount of less than 20 percent by weight, or less than 15 percent by weight, or less than 10 percent by weight, based on the total solids weight of the composition. The amount of infrared transparent pigment present in such compositions may range between any combination of these values, inclusive of the recited values.

In certain embodiments of the present invention, the first coating layer is substantially free, or, in some cases, completely free, of carbon black. As used herein, the term "substantially free" when used with reference to the amount of carbon black in a coating composition, means that carbon black is present in the composition in an amount of no more than 0.1 percent by weight, in some cases no more than 0.05 percent by weight, based on the total solids weight of the composition. As used herein, the term "completely free" when used with reference to the amount of carbon black in a coating composition, means that carbon black is not present in the composition at all.

If desired, the first coating layer can comprise other optional materials well known in the art of formulating surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

As indicated earlier, the coating systems of the present invention further comprise a second coating layer deposited beneath at least a portion of the first coating layer. The second coating layer comprises: (a) a film-forming resin; (b) a thin flake metal or metal alloy infrared reflective pigment; and (c) a visibly absorbing infrared transparent pigment. The film forming resin and visibly absorbing infrared transparent pigment may comprise, for example, any of those described earlier with respect to the first coating layer. In some embodiments, the film forming resin and/or visibly absorbing infrared transparent pigment present in the second coating layer is the same as the film-forming resin and/or visibly absorbing infrared transparent pigment present in the first coating layer. In some embodiments, the film-forming resin and/or visibly absorbing infrared transparent pigment present in the second coating layer is different from the film-forming resin and/or visibly absorbing infrared transparent pigment present in the first coating layer.

The second coating layer in the coating systems of the present invention also comprises a thin flake metal or metal alloy infrared reflective pigment. As used herein, the term "infrared reflective pigment" refers to a pigment that, when included in a coating composition, provides a cured coating with a reflectance of near-infrared radiation, which as used herein, refers to light energy having a wavelength of from 700 to 2500 nanometers, greater than a cured coating deposited in the same manner from the same composition but without the infrared reflective pigment.

Suitable metals and metal alloys include, for example, aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, as well as combinations thereof.

In the present invention, such pigments are in the form of thin flakes. For example, "leafing" aluminum flakes are often suitable. As used herein, the term "thin flake" means that a particle has a ratio of its width to its thickness (termed aspect ratio) that is at least 2 and often falls in the range of 10 to 2,000, such as 3 to 400, or, in some cases, 10 to 200, including 10 to 150. As such, a "thin flake" particle is one that has a substantially flat structure. In some case, such flakes can have a coating deposited thereon, such as is the case with silica coated copper flakes.

In certain embodiments, such thin flake particles have a thickness of less than 0.05 microns to 10 microns, such as 0.5 to 5 microns. In certain embodiments, such thin flake particles have a maximum width of 10 to 150 microns, such as 10 to 30 microns.

In certain embodiments, the second coating layer comprises thin flake particles comprising rounded edges and a smooth and flat surface, as opposed to jagged edges. Flakes having angular edges and uneven surfaces are known in the art as "cornflakes". On the other hand, flakes distinguished by more rounded edges, smoother, flatter surfaces are referred to as "silver dollar" flakes. Moreover, in certain embodiments, the thin flake metal or metal alloy particles comprising rounded edges have a maximum width of no more than 25 micron, such as 10 to 15 micron, when measured according to ISO 1524.

Additional suitable thin flake metal or metal alloy infrared reflective pigments include colored metallic pigments, such as those in which a coloring pigment is chemically adsorbed on the surface of a metallic pigment. Such colored metallic pigments are described in U.S. Pat. No. 5,037,745 at col. 2, line 55 to col. 7, line 54, the cited portion of which being incorporated herein by reference. Some such colored metallic pigments are also commercially available and include those available from U.S. Aluminum, Inc., Flemington, N.J., under the tradename FIREFLAKE. In certain embodiments, an infrared transparent pigment, such as the perylene-based pigments described below, can be chemically adsorbed on the surface of the metallic pigment, to provide a dark, sometimes black, colored infrared reflective metallic pigment.

In certain embodiments, the thin flake metal or metal alloy infrared reflective pigment is present in the compositions from which the second coating layer is deposited in an amount of at least 1% by weight, at least 2% by weight, at least 3% by weight, or, in some cases, at least 5% by weight, at least 6% by weight, or at least 10% by weight, based on the total solids weight of the coating composition. In certain embodiments, the infrared reflective pigment is present in the foregoing coating compositions in an amount of no more than 50% by weight, no more than 25% by weight, or, in some cases, no more than 15% by weight, based on the total solids weight of the coating composition.

In certain embodiments, the second coating layer may further comprise infrared reflective pigments in addition to the thin flake metal or metal alloy infrared reflective pigments described earlier. Such additional infrared reflective pigment can be colored or essentially colorless, translucent or opaque. As used herein, the term "essentially colorless" means that the pigment does not have a color, i.e., the absorption curve for the pigment is devoid of absorption peaks in the 400-700 nanometer range and does not present a tint or hue in reflected or transmitted light when viewed under sunlight. A colored infrared reflective pigment is an infrared reflective pigment that is not essentially colorless. Stated differently, a "colored" infrared reflective pigment is one that may be visibly absorbing, as defined below. A "translucent" pigment means that visible light is able to pass through the pigment diffusely. An "opaque" pigment is one that is not translucent. One example of an infrared reflective pigment that can be translucent and essentially colorless (if used in small enough amounts in a coating) is Solarflair 9870 pigment commercially available from Merck KGaA of Darmstadt, Germany. This commercially available pigment is also an example of an interference pigment (described below) that comprises a mica substrate that is coated with titanium dioxide.

Examples of suitable colored and/or opaque infrared-reflective pigments include, for example, any of a variety of metals and metal alloys, inorganic oxides, and interference pigments. Exemplary colors include, for example, white, as is the case with titanium dioxide; brown, as is the case with iron titanium brown spinel; green, as is the case with chromium oxide green; red, as is the case with iron oxide red; yellow, as is the case with chrome titanate yellow and nickel titanate yellow; blue and violet, as is the case with certain $TiO_2$ coated mica flakes.

Suitable inorganic oxide containing infrared reflective pigments include, for example, iron oxide, titanium oxide ($TiO_2$) pigment, composite oxide system pigments, titanium oxide-coated mica pigment, iron oxide-coated mica pigment, and zinc oxide pigment, among many others.

In certain embodiments, the infrared reflective pigment exhibits greater reflectivity in the near-infrared wavelength region (700 to 2500 nanometers) than it does in the visible region (400 to 700 nanometers). In certain embodiments, the ratio of reflectivity in the near-infrared region to the reflectivity in the visible region is greater than 1:1, such as at least 2:1, or, in some cases, at least 3:1. Certain interference pigments are examples of such infrared reflective pigments.

As used herein, the term "interference pigment" refers to a pigment having a multi-layer structure having alternating layers of material of different refractive index. Suitable light-interference pigments include, for example, pigments comprising a substrate of e.g. mica, $SiO_2$, $Al_2O_3$, $TiO_2$ or glass that is coated with one or more layers of e.g. titanium dioxide, iron oxide, titanium iron oxide or chrome oxide or combinations thereof, or pigments comprising combinations of metal and metal oxide, such as aluminum coated with layers of iron oxide layers and/or silicon dioxide.

In certain embodiments, the weight ratio of infrared reflective pigment to visibly absorbing infrared transparent pigment present in the composition from which the second coating layer is deposited is at least 1.5:1, such as at least 5:1, at least 10:1, or, in some cases, at least 20:1.

In certain embodiments of the coating systems of the present invention, the second coating layer itself is dark, i.e., the second coating layer itself exhibits a CIELAB L *value of no more than 50, such as no more than 45, no more than 40, or, in some cases, no more than 35 or no more than 30. In some cases, the second coating layer exhibits a CIELAB L *value of 25 to less than 30, such as 25 to 29, or 25 to 28, or 25 to 27.

In certain embodiments of the present invention, the second coating layer is, like the first coating layer, substantially free, or, in some cases, completely free, of carbon black. If desired, the second coating layer can comprise other optional materials well known in the art of formulated surface coatings, such as any of those described earlier with respect to the first coating layer.

One advantage of the coating systems of the present invention is that proper use of visually opaque infrared reflective pigments in the second coating layer, such as the thin flake metal or metal alloy infrared reflective pigments described earlier, enables the production of a coating layer that has the requisite hiding at relatively low film thicknesses, such as no more than 2 mils, or, in some cases, no more than 1 mil.

As indicated earlier, the coating systems of the present invention comprise a unique combination of attributes not present in prior infrared reflective coating system. First, it has been discovered that by proper selection of thin flake metal or metal alloy infrared reflective pigment and a visibly absorbing infrared transparent pigment in the second coating layer of the coating systems of the present invention, and their respective amounts, it has been possible to achieve a coating system wherein the first coating layer and the second coating layer have a contrast ratio ($L^*_{second}/L^*_{first}$) of 0.8:1 to 1.7:1, such as 0.8 to 1.6:1, or, in some cases, 1:1 to 1.5:1. Moreover, in some cases, contrast ratios of 0.8 to less than 1:1 have been achieved. As a result, in the coating systems of the present invention, the second coating layer is only marginally lighter in appearance (and in some cases is not lighter in appearance or is even darker in appearance) than the first coating layer. Furthermore, this has surprisingly been achieved without significantly impacting upon the total solar reflectance of the coating system. Therefore, in the coating systems of the present invention, the coating system has a % total solar reflectance ("TSR") of at least 25% and the second coating layer itself has a % TSR of at least 25%. The % TSR values reported herein can be calculated using the methods of ASTM E 903 and ASTM E 891 from data measured with a Cary 50 (Varian) spectrophotometer over the wavelength range of 300-2500 nanometers.

The coating compositions from which each of the coatings described above is deposited can be applied to a substrate by any of a variety of methods including dipping or immersion, spraying, intermittent spraying, dipping followed by spraying, spraying followed by dipping, brushing, or roll-coating, among other methods. In certain embodiments, however, the coating compositions are applied by spraying and, accordingly, such compositions often have a viscosity that is suitable for application by spraying at ambient conditions.

After application of a coating composition to the substrate, it is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. A method of forming a coating film according to the present invention, therefore, comprises applying a coating composition to the surface of a substrate or article to be coated, coalescing the coating composition to form a substantially continuous film and then curing the thus-obtained coating. In certain embodiments, the curing of these coatings can comprise a flash at ambient or elevated temperatures followed by a thermal bake. In some embodiments, curing can occur at ambient temperature of 20° C. to 175° C., for example.

Illustrating the invention are the following examples that are not to be considered as limiting the invention to their details. All parts and percentages in the examples, as well as throughout the specification, are by weight unless otherwise indicated.

EXAMPLES

Examples 1-5

The coating compositions of Examples 1-5 employed a base formulation which contained the ingredients and amounts (grams) listed in Table 1. The base formulation was prepared by adding materials in Table 1 sequentially while under agitation using a propeller style agitation blade.

TABLE 1

| Ingredient | Amount |
| --- | --- |
| Polyester resin solutions[1] | 598 |
| Barium sulfate dispersion[2] | 396 |
| Butylated Melamine Formaldehyde Resin[3] | 233 |
| Acid functional resin[4] | 47 |
| Butylated Urea-Formaldehyde Resin[5] | 119 |
| N-propyl alcohol | 171 |
| 30% solution Dinonylnapthalene Disulfonic Acid[6] | 23 |
| Flow additive[7] | 4 |

[1]Acid functional polyester resin solution (70% by weight resin)
[2]A dispersion of Baramite 10 (from Cinbar Performance Minerals) in a polyester resin
[3]Cymel 1156 available from Cytec Industries.
[4]Anhydride copolymer solution (73% by weight resin)
[5]Cymel U-80 available from Cytec Industries.
[6]Nacure 155 available from King Industries
[7]RK-5345 poly(butyl acrylate) available from DuPont Using the base composition, the coating compositions of Examples 1-5 were prepared using the ingredients and amounts (grams) listed in Table 2. The coatings compositions were prepared by adding materials in Table 2 sequentially while under agitation using a propeller or cowles style agitation blade.

TABLE 2

| Ingredient | Example 1 | Example 2 | Example 3 | Example 4 | Example 5 |
| --- | --- | --- | --- | --- | --- |
| Base Composition | 306 | 306 | 306 | 306 | 306 |
| Infrared Transparent Black Pigment[1] | 161 | 161 | 161 | 161 | 161 |
| Solvent[2] | 100 | 100 | 100 | 100 | 100 |

TABLE 2-continued

| Ingredient | Example 1 | Example 2 | Example 3 | Example 4 | Example 5 |
| --- | --- | --- | --- | --- | --- |
| Aluminum Pigment Paste[3] | 0 | 5 | 15 | 45 | 90 |

[1]Lumogen ® Black FK 4280 pigment from BASF Corporation
[2]Dipropylene glycol monomethyl ether
[3]STAPA ® METALLIC R 507 aluminum pigment paste (65% solids) from Eckart.

Application and Testing

The coating compositions of Examples 1-5 were applied as a draw down over a black and white brushout drawdown card (Leneta Opacity Chart (Form 2a)). The coatings were cured by forced air oven for 30 minutes at 302° F. Dry film thicknesses for each coating are reported in Table 3. The coatings were analyzed for total solar reflectance and color. Results are reported in Table 3.

TABLE 3

| Test | Example 1 | Example 2 | Example 3 | Example 4 | Example 5 |
| --- | --- | --- | --- | --- | --- |
| Average DFT[1] | 0.90 mil | 1.00 mil | 0.90 mil | 0.90 mil | 1.10 mil |
| % TSR[2] | 13.56 | 22.29 | 27.83 | 29.18 | 31.15 |
| Absolute L*[3] | 25.50 | 26.72 | 28.77 | 33.45 | 38.34 |
| Absolute a*[3] | 0.42 | 2.67 | 5.38 | 8.79 | 10.83 |
| Absolute b*[3] | 0.47 | −3.12 | −7.10 | −11.46 | −13.76 |

[1]Coating thickness was measured and recorded using a Fischer permascope.
[2]Solar reflectance values were calculated according to ASTM E903
[3]Color measurements were made using a Gretag MacBeth ColorEye 7000A (gloss included).

Examples 6-21

The coating systems of Examples 8-21 employed two paint formulations, Examples 6 and 7, which contained the ingredients and amounts (grams) listed in Table 4. The coatings systems of Examples 8-21 used various layering combinations of Examples 1-5, other commercially available coatings, and the coatings compositions of Examples 6 and 7. The compositions of Examples 6 and 7 were prepared by adding the materials in Table 4 sequentially while under agitation using a propeller style agitation blade.

TABLE 4

| Ingredient | Example 6 | Example 7 |
| --- | --- | --- |
| HWB6000[1] | 1190 | 1010 |
| Pigment R179 dispersion[2] | 208 | 176 |
| Pigment Bk7 dispersion[3] | 208 | 0 |
| Red mica pigment[4] | 44 | 38 |
| Pigment V29 dispersion[5] | 74 | 0 |
| Tufflake 3620 fi'om Silberline[6] | 8 | 8 |
| Antigassing agent[7] | 2 | 2 |
| Lumongen Black FK4280[8] | 0 | 326 |

TABLE 4-continued

| Ingredient | Example 6 | Example 7 |
|---|---|---|
| 50% solution of dimethylanolamine | 7.2 | 7.5 |
| Deionized water | 130 | 165 |

[1] A clear water-based resin basemix available from PPG Industries, Inc.
[2] A water-based perylene pigment dispersion available from PPG Industries, Inc.
[3] A water-based carbon black pigment dispersion available from PPG Industries, Inc.
[4] Mearlin ® Super Red 4303Z-Ext. CFS from BASF Corporation
[5] A water-based perylene pigment dispersion available from PPG Industries, Inc.
[6] Aluminum pigment paste available from Silberline Mfg.
[7] Lubrizol 2602 available from Lubrizol Corporation
[8] From BASF Corporation Application and Testing The following Examples 8-21 illustrate coating systems that were applied over a test substrate 4"×12" ACT CRS panels electrocoated with ED6060, a cationically electrodepositionable primer commercially available form PPG. These panels are available from ACT Laboratories of Hillsdale, Mich. The primed test substrates were cured 30 minutes at 302° F. and were then coated with the basecoat. The basecoats were cured for 10 minutes at 200° F. All test panels were then coated with DCT5002 diamond coat clear commercially available from PPG Industries, Inc. The coatings were cured by forced air oven. Dry film thicknesses for each coating are reported in Table 5. The coating systems were analyzed for total solar reflectance and the color of the basecoat was measured. Results are reported in Table 5.

TABLE 5

|  | Example 8 | Example 9 | Example 10 | Example 11 | Example 12 | Example 13 | Example 14 |
|---|---|---|---|---|---|---|---|
| Primer | Commercial Grey[1] | Commercial White[2] | Example 1 | Example 2 | Example 3 | Example 4 | Example 5 |
| Primer DFT[3] | 22.9 | 25.4 | 22.9 | 27.9 | 27.9 | 30.5 | 27.9 |
| Basecoat | Example 6 | Example 6 | Example 6 | Example 6 | Example 6 | Example 6 | Example 6 |
| Basecoat DFT[3] | 11.4 | 11.4 | 11.4 | 11.4 | 11.4 | 11.4 | 11.4 |
| Clearcoat DFT[3] | 47 | 47 | 47 | 47 | 47 | 47 | 47 |
| % TSR[4] | 10.38 | 11.09 | 10.41 | 10.97 | 10.92 | 10.99 | 11.20 |
| Absolute L*[5] | 27.89 | 27.67 | 27.73 | 27.83 | 27.71 | 27.74 | 27.89 |
| Absolute a*[5] | 6.95 | 6.75 | 6.65 | 6.75 | 6.62 | 6.65 | 6.89 |
| Absolute b*[5] | 1.74 | 1.74 | 1.75 | 1.73 | 1.74 | 1.76 | 1.77 |

|  | Example 15 | Example 16 | Example 17 | Example 18 | Example 19 | Example 20 | Example 21 |
|---|---|---|---|---|---|---|---|
| Primer | Commercial Grey[1] | Commercial White[2] | Example 1 | Example 2 | Example 3 | Example 4 | Example 5 |
| Primer DFT[3] | 22.9 | 25.4 | 22.9 | 27.9 | 27.9 | 30.5 | 27.9 |
| Basecoat | Example 7 | Example 7 | Example 7 | Example 7 | Example 7 | Example 7 | Example 7 |
| Basecoat DFT[3] | 12.4 | 12.4 | 12.4 | 12.4 | 12.4 | 12.4 | 12.4 |
| Clearcoat DFT[3] | 47 | 47 | 47 | 47 | 47 | 47 | 47 |
| % TSR[4] | 21.25 | 30.35 | 22.55 | 25.92 | 27.97 | 28.05 | 27.85 |
| Absolute L*[5] | 27.49 | 27.44 | 27.54 | 27.42 | 27.42 | 27.46 | 27.65 |
| Absolute a*[5] | 6.53 | 6.40 | 6.56 | 6.32 | 6.29 | 6.40 | 6.72 |
| Absolute b*[5] | 0.09 | 0.12 | 0.12 | 0.16 | 0.16 | 0.16 | 0.10 |

[1] HP77-224E commercially available from PPG Industries, Inc,
[2] HP77-9753 commercially available from PPG Industries, Inc,
[3] Average coating dry film thickness (in microns) was measured using a Fischer pennascope
[4] Solar reflectance values were calculated according to ASTM E903
[5] Color measurements were made using a Gretag MacBeth ColorEye 7000A (gloss included).

Examples 22-29

The coating compositions of Examples 22 and 23 were made using the ingredients and amounts (grams) listed in Table 6. The compositions were prepared by adding materials in Table 6 sequentially while under agitation using a propeller style agitation blade.

TABLE 6

| Ingredient | Example 22 | Example 23 |
|---|---|---|
| Polyester resin solution[1] | 1221 | 130.9 |
| Barium sulfate dispersion[2] | 720 | 77.2 |
| Butylated Melamine Formaldehyde Resin[3] | 318 | 34.1 |
| Acid functional resin[4] | 64 | 6.9 |
| Butylated Urea-Formaldehyde resin[5] | 162 | 17.4 |
| Titanium dioxide dispersion[6] | 207 | 22.2 |
| N-propyl Alcohol | 234 | 25.1 |
| 30% solution Dinonylnapthalene Disulfonic Acid[7] | 31 | 3.3 |
| Flow additive[8] | 5 | 0.6 |
| Dipropylene Glycol Monomethyl Ether | 484 | 51.9 |
| Aluminum Paste[9] | 213 | 22.8 |
| Infrared Transparent Black Pigment Dispersion A[10] | 315 | 108.8 |
| Infrared Transparent Black Pigment Dispersion B[11] | 646 | 169.2 |

[1]Acid functional polyester resin solution (70% by weight resin)
[2]A dispersion of Baramite 10 (from Cillbar Performance Minerals) in a polyester resin
[3]Cymel 1156 available from Cytec Industries.
[4]Anhyride copolymer solution (73% by weight resin)
[5]Cymel U-80 available from Cytec Industries.
[6]A dispersion of titanium dioxide (Ti-Pure ® R-960 from DuPont) in a polyester resin
[7]Nacure 155 available from King Industries
[8]RK-5345 poly(butyl acrylate) available from DuPont
[9]STAPA METALLIC R-507 available from Eckart
[10]A dispersion of Lumogen ® Black FK 4280 pigment (from BASF Corporation) in a polyester resin.
[11]A dispersion of Paliogen ® Black L0086 pigment (from BASF Corporation) in a polyester resin.

The following Examples 24-31 illustrate coating systems that were applied over a test substrate 4"×12" ACT CRS panels electrocoated with ED6060, a cationically electrodepositionable primer commercially available form PPG. These panels are available from ACT Laboratories of Hillsdale, Mich. The primed test substrates were cured 30 minutes at 302° F. and were then coated with the basecoat. The basecoats were cured for 10 minutes at 200° F. All test panels were then coated with DCT5002 diamond coat clear commercially available from PPG Industries, Inc. The coatings were cured by forced air oven. Dry film thicknesses for each coating are reported in Table 7. The coating systems were analyzed for total solar reflectance and the color of the basecoat was measured. Results are reported in Table 7.

TABLE 7

| | Example 24 | Example 25 | Example 26 | Example 27 |
|---|---|---|---|---|
| Primer | Commercial Grey[1] | Commercial White[2] | Example 22 | Example 23 |
| Primer DFT[3] | 24.1 | 25.4 | 29.2 | 30.5 |
| Basecoat | Example 6 | Example 6 | Example 6 | Example 6 |
| Basecoat DFT[3] | 16.0 | 16.0 | 16.0 | 16.0 |
| Clearcoat DFT[3] | 51.6 | 51.6 | 51.6 | 51.6 |
| % TSR[4] | 9.62 | 9.57 | 9.51 | 9.34 |
| Absolute L*[5] | 27.6 | 27.5 | 27.4 | 27.4 |
| Absolute a*[5] | 6.1 | 6.0 | 5.8 | 5.7 |
| Absolute b*[5] | 2.0 | 2.0 | 2.0 | 2.0 |

| | Example 28 | Example 29 | Example 30 | Example 31 |
|---|---|---|---|---|
| Primer | Commercial Grey[1] | Commercial White[2] | Example 22 | Example 23 |
| Primer DFT[3] | 24.1 | 25.4 | 29.2 | 30.5 |
| Basecoat | Example 7 | Example 7 | Example 7 | Example 7 |
| Basecoat DFT[3] | 16.0 | 16.0 | 16.0 | 16.0 |
| Clearcoat DFT[3] | 52.8 | 52.8 | 52.8 | 52.8 |
| % TSR[4] | 23.04 | 29.57 | 27.77 | 27.63 |
| Absolute L*[5] | 27.4 | 27.4 | 27.4 | 27.4 |
| Absolute a*[5] | 5.7 | 5.6 | 5.6 | 5.5 |
| Absolute b*[5] | .7 | .7 | .7 | .7 |

[1]HP77-224E commercially available from PPG Industries, Inc,
[2]HP77-9753 commercially available from PPG Industries, Inc,
[3]Average coating dry film thickness (in microns) was measured using a Fischer pennascope
[4]Solar reflectance values were calculated according to ASTM E903
[5]Color measurements were made using a Gretag MacBeth ColorEye 7000A (gloss included).

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating system comprising:
   (a) a first coating layer having a CIELAB L* value of no more than 40 and comprising:
      (i) a film-forming resin; and
      (ii) a visibly absorbing infrared transparent pigment; and
   (b) a second coating layer deposited beneath at least a portion of the first coating layer and comprising:
      (i) a film-forming resin;
      (ii) a thin flake metal or metal alloy infrared reflective pigment; and
      (iii) a visibly absorbing infrared transparent pigment,
   wherein the first coating layer and the second coating layer have a contrast ratio ($L^*_{second}/L^*_{first}$) of 0.8:1 to 1.6:1;
   wherein the coating system has a % total solar reflectance of at least 25%; and
   wherein the second coating layer has a % TSR of at least 25%.

2. The coating system of claim 1, wherein the contrast ratio is 1.0 to 1.5:1.

3. The coating system of claim 1, wherein the contrast ratio is 0.8 to less than 1:1.

4. The coating system of claim 1, wherein the visibly absorbing infrared transparent pigment is present in an amount of at least 20% by weight, based on the total solids weight of the composition from which the second coating layer is deposited.

5. The coating system of claim 1, wherein the dark IR transparent pigment in the first coating layer comprises a perylene system pigment.

6. The coating system of claim 1, wherein the dark IR transparent pigment in the first coating layer comprises a perylene system pigment.

7. The coating system of claim 1, wherein the second coating layer has an L* value of no more than 30.

8. The coating system of claim 7, wherein the second coating layer has an L* value of 25 to less than 30.

9. The coating system of claim 1, wherein the weight ratio of (b)(ii) to (b)(iii) in the composition from which the second coating layer is deposited is at least 1.5:1.

10. The coating system of claim 9, wherein the weight ratio is at least 5:1.

11. The coating system of claim 10, wherein the weight ratio is at least 10:1.

12. The coating system of claim 11, wherein the weight ratio is at least 20:1.

13. The coating system of claim 1, wherein the IR reflective pigment comprises a metal and/or metal alloy flake pigment.

14. The coating system of claim 13, wherein the flake pigment comprises aluminum.

15. An article comprising the coating system of claim 1 positioned on a surface of the article.

16. The article of claim 15, wherein the article is an aircraft component.

* * * * *